United States Patent [19]

Ostwald

[11] Patent Number: 4,715,665
[45] Date of Patent: Dec. 29, 1987

[54] BRAKE SLIP CONTROLLED BRAKE FOR AUTOMOTIVE VEHICLES

[75] Inventor: Fritz Ostwald, Dreieich, Fed. Rep. of Germany

[73] Assignee: ITT Industries, Inc., New York, N.Y.

[21] Appl. No.: 894,450

[22] Filed: Aug. 4, 1986

Related U.S. Application Data

[63] Continuation of Ser. No. 640,684, Aug. 13, 1984, abandoned.

[30] Foreign Application Priority Data

Aug. 24, 1983 [DE] Fed. Rep. of Germany ....... 3330483

[51] Int. Cl.$^4$ .......................... B60T 15/58; B60T 8/64; B60T 8/42
[52] U.S. Cl. ............................... 303/111; 188/181 A; 303/61; 303/115
[58] Field of Search .................... 303/61, 93, 111, 113, 303/115, 97, 99; 188/181 R, 181 A, 182

[56] References Cited

U.S. PATENT DOCUMENTS

| | | | |
|---|---|---|---|
| 3,833,097 | 9/1974 | Holst | 303/61 X |
| 4,068,904 | 1/1978 | Blomberg et al. | 303/61 X |
| 4,291,924 | 9/1981 | Leiber et al. | 303/111 |
| 4,345,796 | 8/1982 | Reinecke | 303/111 X |

FOREIGN PATENT DOCUMENTS

| | | |
|---|---|---|
| 0051801 | 5/1982 | European Pat. Off. . |
| 1455655 | 6/1969 | Fed. Rep. of Germany . |
| 1902437 | 8/1970 | Fed. Rep. of Germany . |
| 2059340 | 11/1971 | Fed. Rep. of Germany . |
| 2038371 | 2/1972 | Fed. Rep. of Germany . |
| 2043278 | 3/1972 | Fed. Rep. of Germany . |
| 2048802 | 4/1972 | Fed. Rep. of Germany . |
| 2104646 | 8/1972 | Fed. Rep. of Germany . |
| 2258317 | 6/1974 | Fed. Rep. of Germany . |
| 2334493 | 2/1975 | Fed. Rep. of Germany . |
| 2606730 | 9/1976 | Fed. Rep. of Germany . |
| 1251832 | 11/1971 | United Kingdom . |
| 1541218 | 2/1979 | United Kingdom . |

*Primary Examiner*—George E. A. Halvosa
*Assistant Examiner*—Robert J. Oberleitner
*Attorney, Agent, or Firm*—James B. Raden; Robert P. Seitter

[57] ABSTRACT

A brake-slip-controlled brake system for automotive vehicles comprises a master cylinder (1) acted upon by the pedal force (F) in a direct or auxiliary-force-assisted manner and connected with the wheel brake cylinders in the vehicle wheels (VR, HR) e.g. via diagonally allocated hydraulic brake circuits 4, 5. The axial displacement of a rotating cam (32) is controlled by means of sensors (41–43) measuring the braking pressure, the axle loads, and the translational acceleration of the vehicle and feeding corresponding electric signals into an electric circuit arrangement (44). The cam (32) has bevelled control surfaces (48) and acts on braking pressure control valves (8, 9) by way of tappets. In case of control, a pulsating braking pressure is generated by means of said valves (8, 9) the amplitude and the course of the periodic braking pressure variations depending on the axial position and on the design of the cam (32) and hence on the vehicle's braking behavior which was measured by the sensors (41–43) and which was evaluated.

6 Claims, 3 Drawing Figures

BRAKE SLIP CONTROLLED BRAKE FOR AUTOMOTIVE VEHICLES

This is a continuation of U.S. patent application Ser. No. 06/640,684, filed Aug. 13, 1984, now abandoned.

BACKGROUND OF THE INVENTION

This invention relates to a brake-slip-controlled brake system suited for automotive vehicles, in particular for road vehicles, which brake system is provided with a master cylinder acted upon by the pedal force in a direct or auxiliary-force-assisted manner and connected with the wheel brake cylinders via hydraulic or pneumatic brake circuits, which system further has transducers and a braking pressure modulator which, in dependence on the braking behavior of the vehicle, generates pulsations which are reducing the braking pressure.

In the known brake-slip-controlled brake systems the rotational behavior of the brake-slip-controlled wheel e.g. is permanently measured by an inductive sensor and compared with the vehicle's velocity or with a corresponding reference value. If the values measured or the changes, respectively, reveal a lock-up tendency the braking pressure will be reduced in a steady or pulsating manner. As soon as the controlled wheel is re-accelerating the braking pressure will be built up anew so as to enable the wheel to contribute to the braking operation.

The braking behavior of the individual wheels and of the entire vehicle is determined by a plurality of factors largely varying within wide limits. Factors of influence are the road conditions in dependence on the weather and the state of the road, the adhesive power of the tires, the static and dynamic axle loads, as well as the axle load distribution, the rating and the state of the brake system, etc. Trouble factors and inaccuracies in detecting and processing of the values measured are likewise important. For these reasons and because of the high safety and reliability demands which are to be made on principle with regard to brake systems brake-slip-controlled brake systems are relatively expensive and intricate. Thus there exist numerous treatises and publications with regard to the relationships between the signals measured and suitable measures of control and regulation which may be realized at reasonable expense as well as with regard to the selection and design of sensors, evaluation circuits, and braking pressure modulators.

It is also known to limit control to particular wheels only or to one axle alone in order to simplify a slip-controlled brake system and to reduce the manufacturing expense. In such arrangements, the other wheels are acted upon by the same braking pressure or by the braking pressure derived from the controlled wheels or by uncontrolled braking pressure (European Patent Application No. 51,801). Thus, under certain circumstances it will be impossible to avoid the lock-up of particular wheels. Depending on the system chosen or on the limitations chosen as compared with brake systems whose control acts on all wheels, one will accept a loss in the steerability or an increase in the stopping distance in certain situations which will be relatively rare.

In order to avoid a control-device-caused increase in the stopping distance in driving situations to be mastered with particular difficulties such as may occur when driving in deep snow, sand, on rocky stones, or on roads with a relatively thin coating of ice it is further already known to suppress control at one wheel at predetermined time intervals so as to cause said wheel to lock (DE-OS=German Published Patent Application No. 22 58 317).

Further, anti-skid control systems have been described which have pulsators in order to improve the driving stability and the steerability of the vehicle by intermittent braking. (DE-PS=German Pat. No. 20 48 802, DE-AS=German Examined and Printed Patent Application No. 23 34 493). In these systems, controllable single-stage or two-stage pumps are used as pulsators. When the difference between the wheel's rotational deacceleration and the vehicle's deacceleration exceeds a certain value, the pumps are switched on so as to periodically modulate the braking pressure at the respective wheel. In a known system (DE-AS=German Examined and Printed Patent Application No. 23 34 493) the amplitude of the pressure reduction or of the pulsation, respectively, depends on the braking pressure adapted and supplied by way of the brake pedal which may be achieved by means of a control sleeve determining the relieving volume, the control sleeve being adjusted in dependence on the brake pedal force. In this arrangement, a sensor is used as a detecting element for the switching-on of the pulsator. The sensor operates on the principle of the variable response threshold. By means of the sensor, the rotational deacceleration of the wheel(s) is compared with the deacceleration of the vehicle. Control systems of this type are very expensive. No additional complicated measures being provided, control systems of said type are disadvantageous in that the amplitude of the braking pressure, which is pulsating in case of control, will substantially only depend on the braking pressure adapted and supplied by way of the brake pedal.

It is thus an object of this invention to overcome the described disadvantages of the prior art systems and to provide a brake-slip-controlled brake system which will be characterized by a comparatively simple structure and modest manufacturing expense, yet will ensure that in all situations occurring in practice the driving stability and the steerability of the vehicle will be maintained during the braking action, with a stopping distance being achieved which will be as short as possible. Great store was likewise set by a low consumption of energy during control as this will have favorable effects on the costs of manufacture.

SUMMARY OF THE INVENTION

Thus object can be achieved in simple, but technically advanced manner by the further development of a brake system referred to above, wherein sensors which are provided as transducers generate electric signals depending on the braking pressure, the axle loads, and the translational deacceleration of the vehicle; and wherein an electronic circuit arrangement is provided which is conditions logically combines, and processes the sensor signals, the braking pressure modulator is controllable by the output signals of said circuit arrangement.

Several advantageous embodiments of this invention are described in the subclaims. In particular, in many cases, it will be advantageous to design the braking pressure modulator in the form of a braking pressure control valve controlled by means of a cam. On the one hand, the movement of said cam will determine the pulsation frequency. On the other hand, in dependence on the braking behavior or rather on the measured values picked up and logically combined, said cam will vary the pulsation amplitudes. Expediently, in this arrangement, the pulsation frequency will depend on a constant speed of rotation of the cam while the cam stroke determining the pressure variation amplitudes will depend on the axial displacement of the cam.

According to a further advantageous embodiment of this invention there are two braking pressure control valves which each control the braking pressure of one vehicle's diagonal and which are adjusted via a joint cam in parallel or out of phase, preferably 180° out of phase.

According to another advantageous embodiment, a braking pressure control valve suitable for the inventive brake system substantially consists of a cylinder through which pressure medium is flowing and in which there is a piston displaceable by the cam and confining a plunger chamber, the passage being released by means of an open seat valve in that one of the end positions of the piston which corresponds to the minimal plunger volume. As soon as the piston moves out of this end position the seat valve will close, the braking pressure being reduced by the expansion of the plunger chamber communicating with the wheel brake cylinder.

The inventive brake system thus consists of very few, relatively simple components, only, which thus allow an inexpensive manufacture and which moreover permit to be added between the usual master brake cylinder and the wheel brake cylinders at a later time. The sensors, namely the pressure sensors and the load sensors as well as the translational deacceleration transducer, likewise may be added later without any additional expense worth mentioning as, in contrast e.g. to wheel speed sensors, it will not be necessary to fit them into the wheel hub and as a difficult adjustment will not be required.

Despite the limitation to a few, structurally relatively simple parts it is possible to achieve a quick and precise control of the braking pressure and regulation of the brake slip, which will be up to all requirements thanks to the chosen combination of components or rather thanks to the mentioned transducers in combination with the electronic signal processing system and the rotating, axially displaceable cam acting on the described braking pressure control valves.

A further, advantageous of the inventive brake system in a preferred embodiment is that the energy released during the periodical braking pressure variations in the pressure reduction phase will be transmitted to the cam and to the gyrating mass of the drive motor via the piston of the braking pressure control valve, in that it will be stored in the form of kinetic energy, and in that it will be recycled at least partially in the subsequent phase of pressure build-up. Separate, expensive energy stores and auxiliary energy supply systems will thus become superfluous which will have a very favorable effect on the manufacturing expense of the entire system.

The limitation the invention provides with regard to low-cost braking pressure sensors, axle load sensors, and translational sensors, only in special cases further sensors being additionally installed, is based on the knowledge that a direct monitoring of the wheels' rotational behavior is not necessary for brake slip control. Because there is always a close relation between the braking pressure and the translational deacceleration of the vehicle. This relation will only be disturbed by an imminent instabilization of the vehicle due to an overbraking. Thus, the electronics will be able to detect a lock-up tendency from the corresponding electric sensor signals in time and to counteract this tendency by periodic pressure variation by means of the amplitudes and cycle times calculated from the measured values and from the vehicle's behavior.

BRIEF DESCRIPTION OF THE DRAWING

Further characteristics, advantages, and applications of this invention will become evident from the following description of examples of embodiments, reference being made to the drawing wherein.

DETAILED DESCRIPTION

Figure 1:
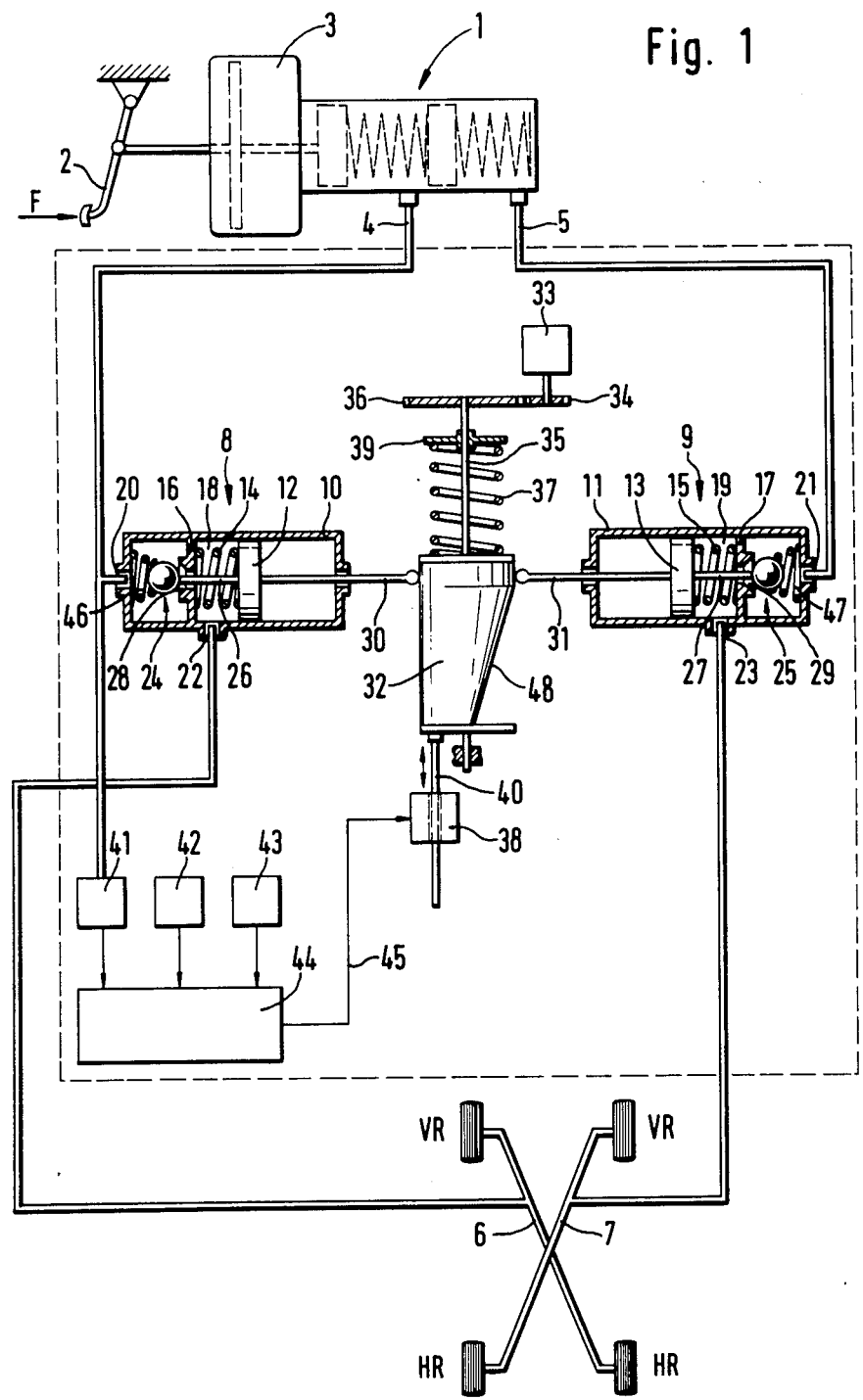
FIG. 1 is a block diagram of a brake system according to the present invention.

In the embodiment according to FIG. 1, the system according to the present invention comprises a conventional tandem master cylinder 1 schematically indicated and acted upon by a pedal force F via the pedal 2, auxiliary-force-assisted by the vacuum booster 3. The two brake circuits 4, 5 of the tandem master cylinder 1 each lead to a diagonal 6, 7 of a vehicle whose front wheels VR and rear wheels HR are symbolically represented.

Inserted into the connection between the master cylinder 1 and the vehicle's diagonals 6, 7 are braking pressure modulators 8, 9 with an appertaining cam control. In FIG. 1, all the parts required for the brake slip control are framed by a broken line. This is to illustrate that all the parts required for control may be inserted into an uncontrolled brake system also at a later time.

The braking pressure control valves of the illustrated embodiment substantially consist of cylinders 10, 11 through which pressure medium, for example brake fluid, is flowing and inside which each pistons 12 and 13, respectively, are axially displaceable against the force of a return spring 14, 15 resting at a stationary wall 16, 17. The piston 12, 13, the wall 16, 17 and the circumferential surface of the cylinder 10, 11 confine a plunger chamber 18, 19. In the illustrated end position, said plunger chamber 18, 19 has its minimal volume. In this end position, there will be an unhindered flow from the inlet 20, 21, connected with the master cylinder 1 to the outlet 22, 23 leading respectively to the wheel brake cylinders and to the vehicle's diagonals 6, 7. Because in this end position of the piston 12, 13, the valve member, a ball in this case, which belongs to a seat valve 24, 25 provided on the side of the master cylinder is lifted off from its valve seat 28, 29 by means of a tappet 26, 27 connected with the piston 12, 13.

The piston 12, 13 of each braking pressure control valve 8, 9 will mechanically be adjusted by a cam 32 via the tappet resting at this cam 32 and connected at the piston 12, 13.

An electric motor 33 will cause the cam 32 to rotate, the driving torque being transmitted via a motor pinion 34 to a driven 36 connected with the cam axle 35.

Further, the cam 32 is axially disdplaceable against the force of a return spring 37. In FIG. 1, that axial end position of the cam 32 is represented in which, independently of the rotation of the cam 32, the two pistons 12, 13 of the braking pressure control valves 8, 9 will be kept in that end position in which the two valves are permanently 'open' or rather permit the pressure medium to pass through.

The axial displacement of the cam 32 will be controlled by means of a step-by-step motor or by means of a solenoid 38 displacing a tappet 40 parallel to the axis and thus defining the axial position of the cam 32.

Figure 2:
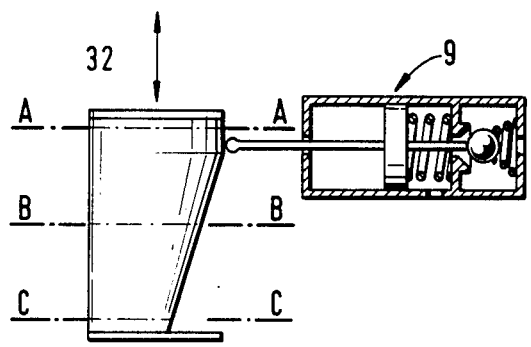
FIG. 2 shows the cam according to FIG. 1, several sectional planes.
Figure 3:
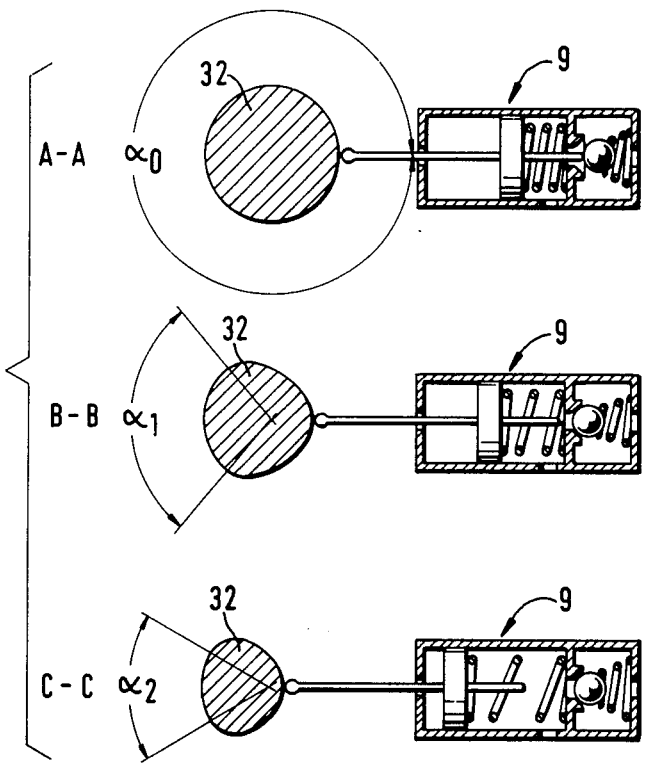
FIG. 3 shows the cross-section of the cam according to FIG. 2 in the three sectional planes A—A, B—B, and C—C according to FIG. 2.

In the represented embodiment the two braking pressure control valves 8, 9 acting on the two brake circuit diagonals 6, 7 will be controlled 180° out of phase. A contour of the cam suited for this purpose is represented in FIGS. 2 and 3. An approach of the cam 32 to the stop 39 will thus result in an increase of the stroke performed by each piston upon a full rotation of the cam 32 around its axle 35 and hence of the amplitude with which the braking pressure is supplied into the diagonals 6, 7 or rather into the wheel brake cylinders connected to the diagonals. At the same time, in the embodiment of the cam 32 chosen here, as discernible from FIG. 3, the axial displacement of the cam 32 varies the cycle ratio, i.e. the duration of the pressure reduction phase relative to the pressure build-up phase. In FIG. 3, in the middle plane (B—B) and in the lower plane (C—C) of the cam 32 there is marked the angle $\alpha_1$, $\alpha_2$. Said angle determines the time interval in which during each rotation of the cam 32 the indicated braking pressure control valve 9 will generate a braking pressure maximum. In the plane (A—A) or rather in the initial position it will come up to $\alpha_o = 360°$.

As soon as the cam 32 is displaced against the force of the spring 37, the pistons 12, 13 periodically being displaced towards the cam axle 35, the seat valve 24, 25 will close. This will be effected by causing the ball-type valve member to abut on its seat 28, 29 under the influence of the spring 46, 47 and of the braking pressure active in the master cylinder 1.

The axial position of the cam 32 which, as explained, defines the stroke of the pistons 12, 13; and, the course of the pressure during each cam rotation depends on the measured values detected by means of sensors 41, 42, and 43 and on the processing and logical combination of said measured values in the electronic circuit arrangement 44 for providing an output signal indicative of said braking behavior. The signal line 45 via which the solenoid 38 is controlled by the output signal of the circuit arrangement 44 is likewise marked. The arrangement 44 is realized in the form of an integrated circuit with fixed allocation or in the form of a programmable circuit, a so-called micro-controller.

The brake system according to FIG. 1 functions as follows:

As long as the braking operation is stable, no lock-up tendency being sensed, the two circuits 4 and 5 of the master cylinder 1 are directly connected with the diagonals 6, 7 via the open valves 24, 25. The motor 33 and the cam 32 driven by said motor are idling, with a measure (not shown) such as an ohmic resistor or an electronically controlled series resistor or a wiring of the exciting windings ensuring that the power consumption of the motor 33 will be low in no-load operation and that the motor 33 will not be switched over to 'full power' until the application of the brake.

In the initial position, the tappets 30, 31 will move on a circular orbit coaxial to the axle 35 (see cross-section A—A of FIG. 3), thus the stroke of the pistons 12, 13 being zero. If, by comparing the signals fed in from the sensors 41-43, the electronic circuit arrangement 44 detects that there is an instability or a lock-up tendency, the cam 32 will be displaced axially by the actuation of the solenoid 38 so that the bevelled control surface 48 of the cam 32 will come into operation. During each rotation, the seat valves 24, 25 will be closed for a short time and the volumes of the plunger chambers 18, 19 will be increased by the displacement of the pistons 12, 13 and reduced again down to the minimum for a predetermined time depending on the axial position of the cam 32. The braking pressure fed into the wheel brake cylinders via the diagonals 6, 7 thus will periodically be reduced and built up again, the variation amplitude and the cycle ratio depending on the axial position of the cam 32 and on its shape. As the rotational speed of the cam 32 is kept approximately constant, the repetition frequency of the pressure reduction signals or rather the frequency of the periodic pressure variation likewise is approximately constant.

In the described example of an embodiment the two braking pressure control valves are controlled 180° out of phase. Thereby a braking pressure maximum at one wheel of one axle will coincide with the minimum of the second wheel of the same axle. With a sufficiently high pulsation frequency of e.g. 5 to 10 cycles the influence on the course stability will be unimportant due to the rapid succession of phases of strong braking and of complete debraking. If required, the stability may even be increased by the negative scrub radius. In some chasis designs, however, it may be more favorable to control the braking pressure control valves in parallel.

Instead of two braking pressure control channels it is also possible to vary the pressure in all brake circuits jointly or to effect a split-up into three or four control circuits actuated out of phase or in parallel by way of one sole cam.

Further, in special cases, in order to improve the accuracy of control and/or to increase the speed of response it is possible to install further sensors, e.g. braking torque sensors or braking force sensors, and to evaluate their output signals in the electronic combination in the circuit arrangement 44. Sensors of this type which are known are strain gauges.

What is claimed is:

1. A brake-slip-controlled brake system for an automotive vehicle including a master cylinder acted upon by a pedal force of the vehicle brake and said master cylinder being connected to a plurality of wheel brake cylinders respectively by way of a plurality of brake circuits, said system comprising, in combination:

a plurality of sensors respectively coupled to said vehicle for providing electrical signals indicative of vehicle braking behavior;

means coupled to said sensors for providing an output signal indicative of said braking behavior;

an axially displaceable rotating cam being rotatable about a given axis and longitudinally displaceable from a normal position of rest to a plurality of positions along said axis in response to said output signal, said cam being longitudinally tapered along said axis and having an eccentric cross section which varies in shape along said axis;

said cam including one axially extending portion throughout the entire length of said cam and which has a constant predetermined radial distance from said axis to thereby provide a high lobe substantially parallel to said axis;

means responsive to said output signal for translating said cam along said axis; and at least two braking pressure modulators each being respectively coupled to one of said brake circuits between said master cylinder and one of said brake cylinders, each of said modulators comprising a cylinder having a movable piston slidably mounted therein and each of said pistons having a tappet extending outwardly away from its cylinder for engaging said cam, and valve opening means extending in the opposite direction from said piston.

2. The brake system according to claim 1, wherein said cam includes a normal first tappet engaging portion adjacent one end thereof in its normal position of rest, said first portion having a concentric cross section that has said predetermined radial dimension and of definite axial extent which is capable in said first portion of maintaining all of said pistons in a normal open valve position, and axially continguous second and third tappet engaging portions, each having an eccentric cross section longitudinally displaced from said first portion, whereby said second and third portions cause said valve opening means to open and close said valves during each revolution of said cam thereby creating a controlled pulsation of pressure to said brakes.

3. The brake system according to claim 2, wherein said first, second and third portions are interconnected by smooth tapered transition surfaces.

4. The brake system according to claim 3, wherein the eccentric cross-sectional shape of said second portion provides a maximum translation of each of said pistons during an angular translation of said cam equal to $\alpha_1$ degrees, wherein the eccentric cross-sectional shape of said third portion provides a maximum translation of each of said pistons during an angular translation of said cam equal to $\alpha_2$ degrees, and wherein $\alpha_1$ is greater than $\alpha_2$.

5. The brake system according to claim 2, wherein said cam is rotated at a substantially constant speed and the rapidity of movement of the tappets between a normally open and a closed position is dependent upon the lineal speed of said rotating cam in any given cross-sectional plane perpendicular to said axis and induced by its smaller radial extent measured progressively along said axial extent.

6. The brake system of claim 5, wherein said first and second modulators are positioned in opposition to one another on opposite sides of said cam axis to thereby provide alternate pulsations of equal intensity to said plurality of cylinders.

* * * * *